United States Patent
Wilkinson et al.

(10) Patent No.: US 8,669,915 B2
(45) Date of Patent: Mar. 11, 2014

(54) METHOD AND APPARATUS PERTAINING TO AN RFID TAG READER ANTENNA ARRAY

(75) Inventors: Bruce W. Wilkinson, Rogers, AR (US); Nicholaus A. Jones, Fayetteville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 731 days.

(21) Appl. No.: 12/900,191

(22) Filed: Oct. 7, 2010

(65) Prior Publication Data

US 2012/0086553 A1 Apr. 12, 2012

(51) Int. Cl.
*H01Q 1/42* (2006.01)

(52) U.S. Cl.
USPC .......................................... 343/872; 343/890

(58) Field of Classification Search
USPC ............. 343/872, 890, 892; 340/572.1, 572.7
See application file for complete search history.

(56) References Cited

U.S. PATENT DOCUMENTS

| | | | |
|---|---|---|---|
| 5,999,145 A * | 12/1999 | Niekamp | 343/890 |
| 7,036,734 B2 * | 5/2006 | Baker | 235/451 |
| 7,187,288 B2 | 3/2007 | Mendolia et al. | |
| 7,205,896 B2 | 4/2007 | Wu et al. | |
| 7,528,726 B2 | 5/2009 | Lee et al. | |
| 8,451,125 B2 * | 5/2013 | Hong et al. | 340/572.7 |
| 2003/0201940 A1 | 10/2003 | Chiang et al. | |
| 2008/0036674 A1 | 2/2008 | Riedel et al. | |
| 2008/0284656 A1 | 11/2008 | Petropoulos | |
| 2010/0079245 A1 | 4/2010 | Perng et al. | |

OTHER PUBLICATIONS

PCT; App. No. PCT/US2011/054908; International Search Report mailed Feb. 29, 2012.
PCT; App. No. PCT/US2011/054908; Written Opinion mailed Feb. 29, 2012.

* cited by examiner

*Primary Examiner* — Tan Ho
(74) *Attorney, Agent, or Firm* — Fitch, Even, Tabin & Flannery LLP

(57) ABSTRACT

One or more frame components that each comprise 1/Xth of a 360 degree RFID tag reader antenna array can be physically coupled to one another to thereby form a multi-frame component. One or more RFID tag reader antenna mounts can comprise a part of such frame components and can be configured to aim a corresponding RFID tag reader antenna outwardly of the frame component. These teachings also accommodate disposing a plurality of RFID tag reader antenna units within a facility such that these antenna units are disposed higher than an expected location of, say, at least 90% of the RFID tags when the latter are in the facility. By one approach these antenna units can all be disposed at a substantially same height within the facility. These antenna units may, or may not, be visually concealed as desired.

15 Claims, 4 Drawing Sheets

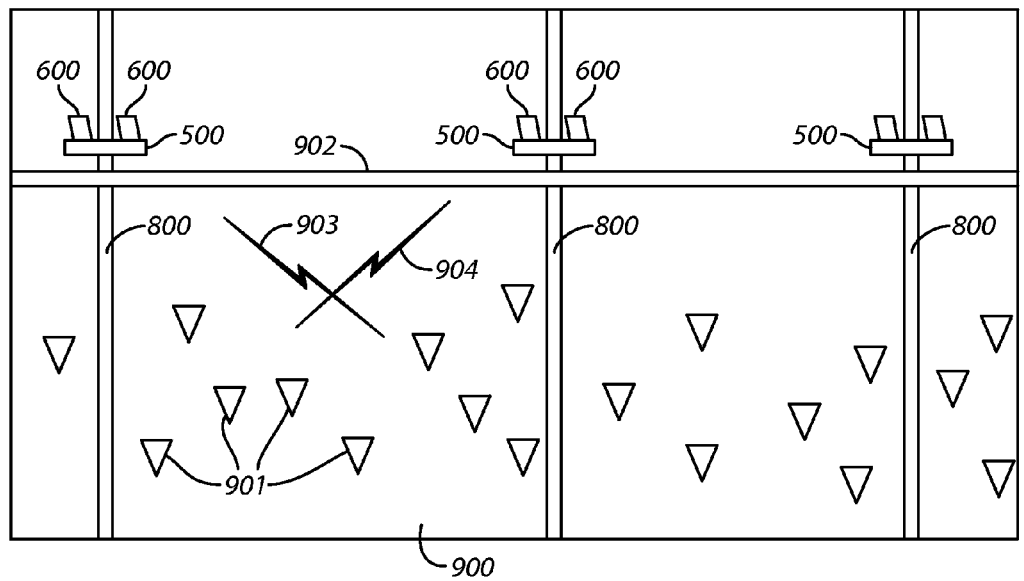
*FIG. 9*
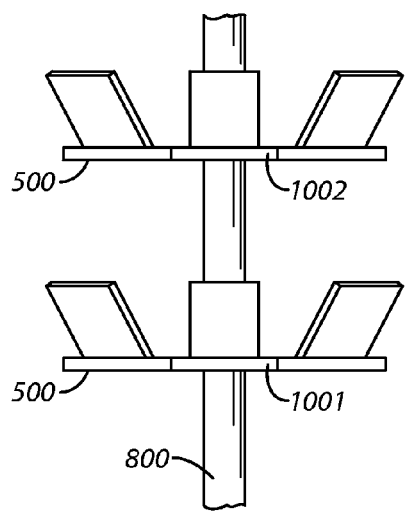 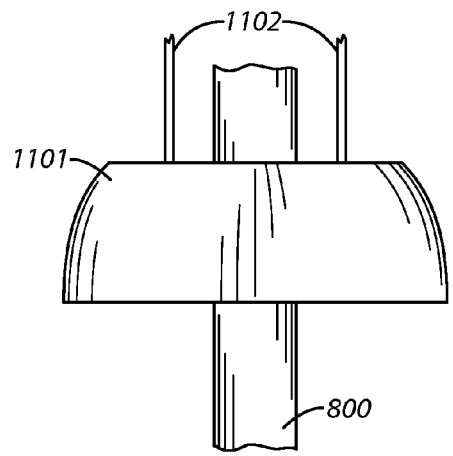
*FIG. 10*   *FIG. 11*

US 8,669,915 B2

METHOD AND APPARATUS PERTAINING TO AN RFID TAG READER ANTENNA ARRAY

TECHNICAL FIELD

This invention relates generally to the reading of radio frequency identification (RFID) tags and more particularly to RFID tag reader antenna arrays.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item associated on a one-for-one basis with such tags.

Being able to read and then uniquely identify each item within a manufacturing facility, a cargo container, a staging area, or in a retail display area offers any number of useful opportunities. Reading tags, particularly in bulk, comprises one area of endeavor in these regards. This often comprises reading the RFID tags for a number of items as those tags pass through a given controlled and relatively narrow and confined point of access (such as a doorway leading from a loading dock to an indoor staging area). In other cases, as when the RFID tags are distributed throughout a larger and less-controlled area, this often comprises reading the RFID tags using handheld RFID tag readers that are selectively moved through the tag population by a corresponding human handler.

While successful and effective to a point, such approaches nevertheless fail to address all useful application settings. For example, for practical and/or economic reasons, such approaches are not particularly well suited for use in relatively large facilities that contain relatively large numbers of RFID tags in circumstances that are always uniformly well suited to tag reading (and especially tag reading on a frequent or even largely-continuous basis).

BRIEF DESCRIPTION OF THE DRAWINGS

The above needs are at least partially met through provision of the method and apparatus pertaining to an RFID tag reader antenna array described in the following detailed description, particularly when studied in conjunction with the drawings, wherein:

FIG. 9 comprises a side-elevational schematic view as configured in accordance with various embodiments of the invention;

FIG. 10 comprises a side-elevational view as configured in accordance with various embodiments of the invention; and FIG. 11 comprises a side-elevational view as configured in accordance with various embodiments of the invention.

Figure 1:
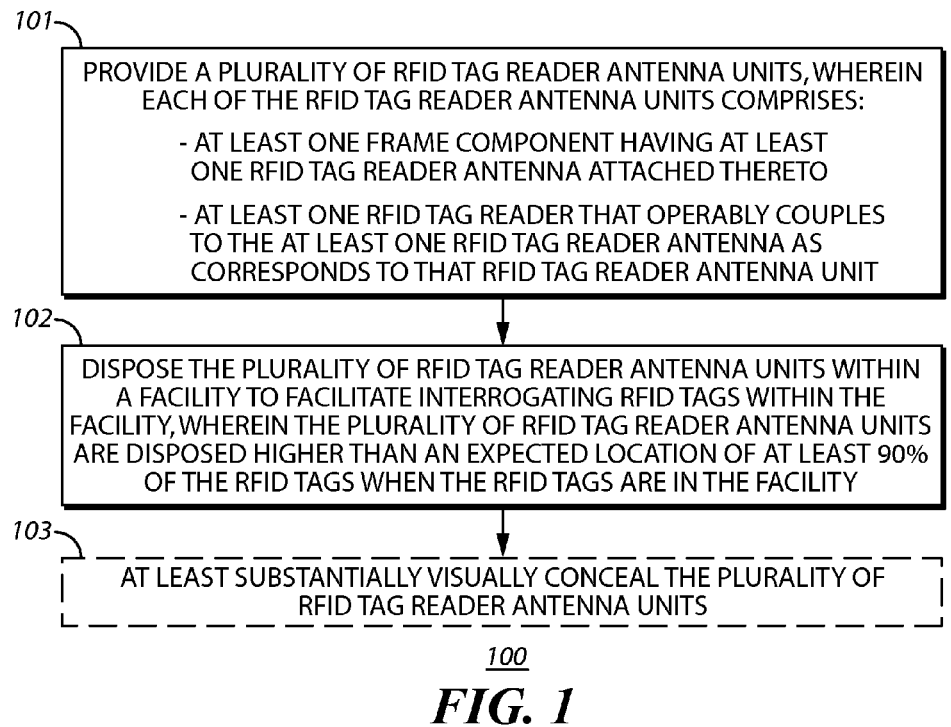
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to at least some of these various embodiments, these teachings provide one or more frame components that each comprise 1/Xth of a 360 degree RFID tag reader antenna array. These frame components can be configured to physically couple to at least one other such frame component to thereby form a multi-frame component. By one approach, this multi-frame component can conveniently comprise a symmetrically-shaped polygon such as a circle, square, or octagon that is laterally symmetrical about a central axis. These teachings further provide one or more RFID tag reader antenna mounts that comprise a part of such frame components. These mounts can be configured to aim a corresponding RFID tag reader antenna outwardly of the frame component. By one approach these mounts are configured to mount and retain at least one antenna element at a downward angle, wherein the downward angle is selected at least as a function of a height of the frame relative to an expected population of RFID tags. In any event, so configured, connecting X such frame components together will yield a 360 degree RFID tag reader antenna array having a plurality of RFID tag reader antennas disposed thereon.

"X" can equal an integer of choice greater than "1." Useful examples at least include X equaling 2, 4, and 8.

By one approach, a first group of the aforementioned plurality of RFID tag reader antennas is disposed at a first substantially-identical pitch while a second group of these antennas is disposed at a second substantially-identical pitch that is different from the first substantially identical pitch. If desired, the antennas comprising the first group are interleaved with the antennas of the second group.

These teachings will readily accommodate a variety of RFID tag reader antennas. This can include, for example, plate antennas and/or phased array-type antennas.

Also pursuant to at least some of these embodiments, these teachings provide for disposing a plurality of RFID tag reader antenna units within a facility such that these antenna units are disposed higher than an expected location of, say, at least 90% of the RFID tags when the latter are in the facility. By one approach these antenna units can all be disposed at a substantially same height within the facility. In any event, the antenna units may, or may not, be visually concealed. For example, the antenna units may be partially or wholly concealed within a corresponding shroud or may be disposed within a ceiling for the facility.

In an application setting where the facility has one or more vertical support columns, these teachings will accommodate disposing such an antenna unit about such vertical support columns. These teachings will also support disposing one or more such antenna units in an interior corner of such a facility or on a wall thereof.

By one approach, such an antenna unit can be fixably mounted to, for example, a vertical surface such as a wall or column. By another approach, however, the antenna unit can be suspended from above in the manner of a chandelier.

These teachings provide a flexible and highly leverageable approach to providing a plurality of RFID tag reader antenna arrays throughout a large facility such as a modern large retail facility. By providing for a modular approach to the construction of such an array these teachings will readily accommodate a variety of application settings including but not limited to leveraging the availability of vertical support columns, interior corners, and so forth in a highly convenient and economical fashion. By installing such arrays above the great majority of likely RFID tags within a monitored facility, these teachings can greatly facilitate the reading of such tags in a wide variety of circumstances including the sometimes difficult and challenging dynamic radio frequency propagation circumstances that often characterize a modern retail enterprise.

These and other benefits may become clearer upon making a thorough review and study of the following detailed description. Referring now to the drawings, and in particular to FIG. 1, an illustrative process 100 that is compatible with many of these teachings will now be presented.

At step 101 this process 100 provides a plurality of RFID tag reader antenna units. Each of these antenna units comprises at least one frame component having at least one RFID tag reader antenna attached thereto. By one approach, these teachings will accommodate employing a plurality of such frame components, in combination, to form such an antenna unit. In such a case, each frame component can comprise 1/Xth of a 360 degree RFID tag reader antenna array where "X" is an integer greater than 1.

Figure 2:
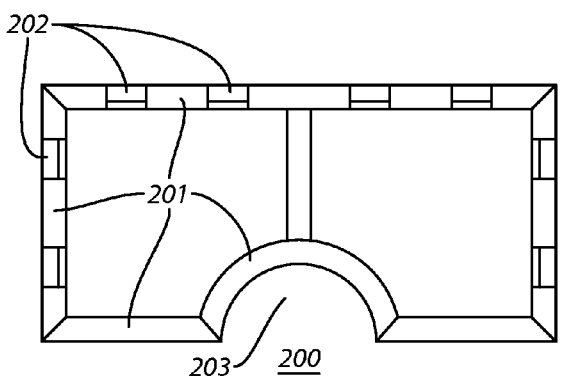
FIG. 2 comprises a top-plan view as configured in accordance with various embodiments of the invention.

By one approach, and referring momentarily to FIG. 2, X equals 2. In this case, each frame component 200 can comprise one half of a 360 degree RFID tag reader antenna array that comprises two such frame components 200 physically coupled to one another to from a multi-frame component. In this illustrative example, the frame component 200 is comprised of various lengths of hollow, square conduit 201 that connect to one another with an attachment mechanism (not shown) of choice (such as welding, an adhesive, bolts, rivets, snaps, and so forth). Such conduit can comprise any suitable material including, for example, a metal or plastic of choice. If desired, this conduit can have a different form factor (such as a circular cross section) or can be solid rather than hollow.

It would also be possible to form such a frame component as one integral piece (using, for example, an appropriate molding process) as desired.

Antenna mounts 202 are, in turn, disposed on selected conduits 201 in appropriate positions to facilitate attaching RFID tag reader antennas to the frame component 200. This illustrative example also depicts a circularly-shaped area 203. This circularly-shaped area 203 can serve to accommodate, for example, a vertical support column as described below in more detail.

Figure 3:
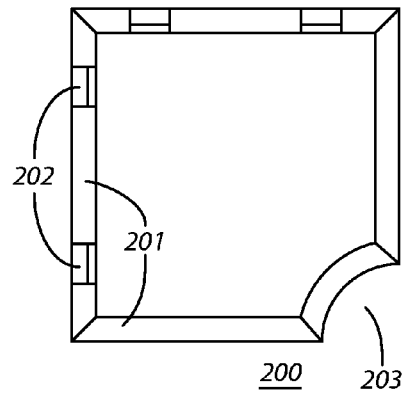
FIG. 3 comprises a top-plan view as configured in accordance with various embodiments of the invention.

By another approach, and referring now momentarily to FIG. 3, X can equal 4. In this case, each frame component 200 can comprise one fourth of a 360 degree RFID tag reader antenna array that comprises four such frame components 200 physically coupled to one another to form the multi-frame component. In both this example and the example of FIG. 2 the sides of the outer periphery of the frame component 200 are linear. In these cases the resultant multi-frame component can comprise a rectangle such as a square. Other form factors are of course possible. By one approach, for example, the periphery can be curved. In such a case the resultant multi-frame component could have an oval-shaped or circularly-shaped periphery.

Figure 4:
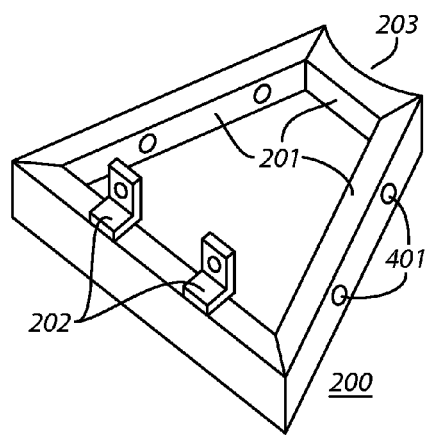
FIG. 4 comprises a perspective view as configured in accordance with various embodiments of the invention.
Figure 5:
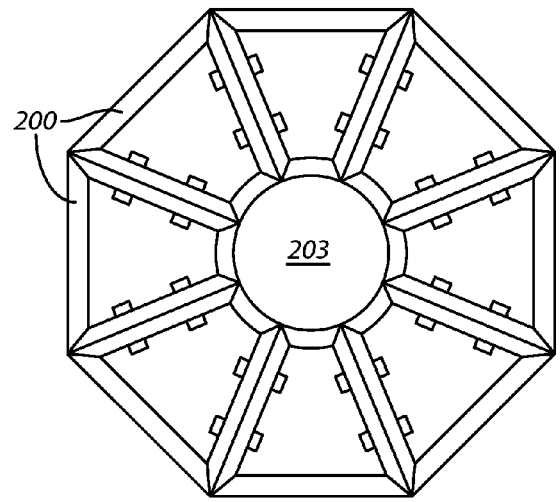
FIG. 5 comprises a top-plan view as configured in accordance with various embodiments of the invention.

By yet another approach, and referring now momentarily to FIGS. 4 and 5, X can equal 8. In this case each frame component 200 can comprise one eighth of a 360 degree RFID tag reader antenna array 500 that comprises eight such frame components 200 physically coupled to one another. In this illustrative example, holes 401 are provided in selected members of the frame components 200 to permit bolts (not shown) to be disposed therethrough to thereby fasten one frame component 200 to another. So configured, the resultant 360 degree RFID tag reader antenna array 500 comprises an octagon.

In this particular illustrative example, each such frame component 200 has a pair of antenna mount brackets 202 to permit a single RFID tag reader antenna to be mounted to a given frame component 200. These brackets 202 can have a fixed form or can be adjustable as desired. In either case, the particular brackets 202 utilized with a given frame component 200 can serve to hold the antenna at a given desired orientation.

These teachings will readily accommodate using any of a variety of RFID tag reader antennas. This can include, for example, a phased-array type antenna. A phased-array type antenna typically comprises an array of two or more (often similarly or identically designed) antennas and delaying the provision of the signal to be transmitted to at least one of the antennas. The aggregated radio frequency energy as emanated from this array is then concentrated in a desired direction. This, in turn, produces a result similar to that of properly aiming a single antenna in the same direction. Phased-array antennas can be dynamically controlled, if desired, to permit the phased array to point in various directions at various times. Such an antenna might be appropriate to use in conjunction with the 360 degree RFID tag reader antenna array 500 examples suggested by FIGS. 2 and 3.

Figure 6:
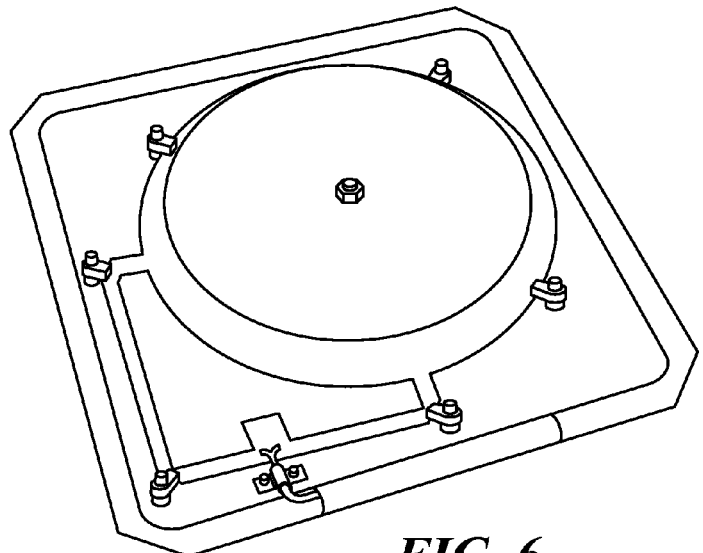
FIG. 6 comprises a perspective view as configured in accordance with various embodiments of the invention.

As another example in these regards, and referring now momentarily to FIG. 6, the antenna can comprise a plate antenna 600 as shown. Plate antennas are very well known in the art and require no further elaboration here. (Those skilled in the art will recognize that this antenna is shown sans housing but that in many application settings a housing comprised of material (such as plastic) that is at least substantially transparent to radio-frequency energy will surround part or all of the electromagnetically-active components of the antenna.)

Figure 7:
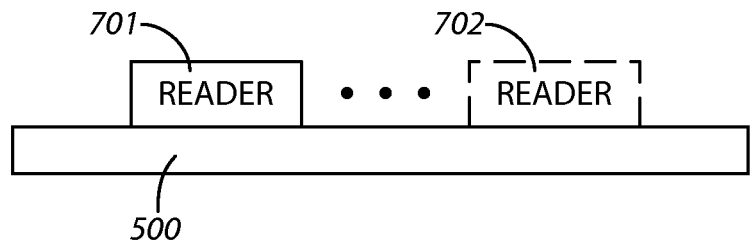
FIG. 7 comprises a side-elevational schematic view as configured in accordance with various embodiments of the invention.

With continued reference to FIG. 1, in this illustrative example step 101 also specifies that the RFID tag reader antenna units comprise at least one RFID tag reader that operably couples to the RFID tag reader antenna as corresponds to that RFID tag reader antenna unit. (These teachings will also accommodate, however, mounting the RFID tag reader elsewhere than on the antenna unit itself. For example, a single reader might be mounted on a wall between two separate antenna units and operably couple to both.) When the RFID tag reader antenna unit comprises a plurality of frame components, and hence includes a plurality of RFID tag reader antennas, by one approach this RFID tag reader can couple to all of these antennas. Referring momentarily to FIG. 7, and by way of illustration and not limitation, these teachings will permit supporting from one such reader 701 to a plurality of readers (as exemplified by the Nth reader denoted by reference numeral 702) per each 360 degree RFID tag reader antenna array 500. For many application settings, for example, this can comprise using two RFID tag readers for each 360 degree RFID tag reader antenna array 500. Multiple readers may sometimes be useful (or necessary) to accommodate a particular number of antennas. Also, in at least some application settings, improved performance can result when the antennas are connected in an interleaved manner to, for example, two different readers (for example, a first antenna connects to a first reader, a next adjacent second antenna connects to a second reader, a next adjacent third antenna connects to the first reader, and so forth).

At step 102 of this illustrative process 100, this plurality of RFID tag reader antenna units is disposed within a given facility to facilitate interrogating RFID tags that are within this facility. This facility will typically comprise an indoors environment but these teachings can be employed externally as well if desired. These teachings are highly flexible and will support use in a wide variety of facilities. Examples in these regards include, but are not limited to, retail establishments of various kinds and sizes (including so-call Big Box establishments that offer a variety of goods under a single roof and typically without many (or any) floor-to-ceiling walls to separate one offering of goods from another), storage depots, distribution and shipping centers, manufacturing facilities, and so forth.

Figure 8:
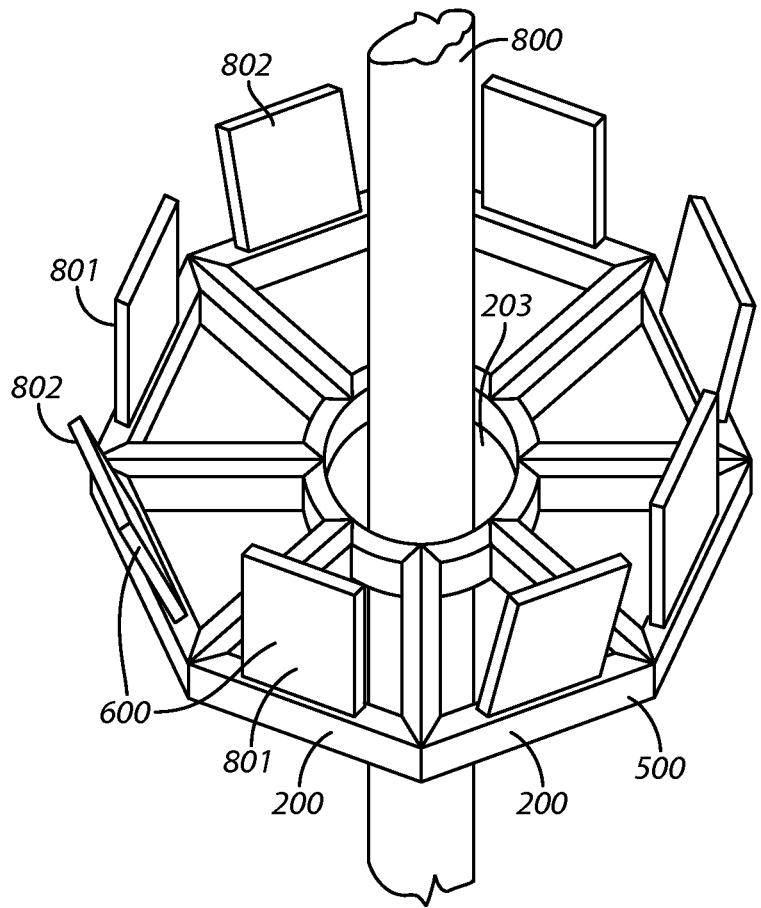
FIG. 8 comprises a perspective view as configured in accordance with various embodiments of the invention.

Many such facilities include one or more vertical support columns (which may, or may not, be load bearing). As alluded to earlier, by one approach these teachings yield a 360 degree RFID tag reader antenna array 500 having a centrally-located opening 203 that can accommodate such a column. FIG. 8 provides an illustrative example in these regards. Here, the 360 degree RFID tag reader antenna array 500 encircles a corresponding vertical support column 800. By one approach, for example, the two halves of this octagon-shaped 360 degree RFID tag reader antenna array 500 can be brought together to surround the vertical support column 800 as shown and then can be physically coupled to one another.

These teachings will support a variety of approaches with respect to installing the array in an installed location. Generally speaking, this can comprise employing a mounting structure that is coupled to the frame and that is configured to mount the frame in a desired location (for example, and as discussed below, as elevated above a plurality of RFID tags to be interrogated). By one approach, this opening 203 can be the same size as the column 800 (or even slightly smaller) to thereby hold the 360 degree RFID tag reader antenna array 500 in place via a friction fit. By another approach, in lieu of the foregoing or in combination therewith, the 360 degree RFID tag reader antenna array 500 can be secured to the column 800 using an attachment mechanism of choice (such as one or more brackets). By yet another approach, the 360 degree RFID tag reader antenna array 500 can be suspended in place using, for example, overhead cabling or the like.

Generally speaking, for many application settings, the 360 degree RFID tag reader antenna array 500 is installed in a substantially horizontal orientation. Other orientations are possible, however, to address the specific limitations or opportunities as tend to characterize a given application setting.

FIG. 8 illustrates an octagon-shaped array comprised of eight frame components 200 that each have a single corresponding RFID tag reader antenna 600. These antennas 600 are positioned to radiate RFID tag interrogations outwardly of the array. So configured, at least two RFID tag reader antennas are disposed on substantially opposing sides of the 360 degree RFID tag reader antenna array 500 and hence are configured to radiate RFID tag interrogations outwardly therefrom.

By one approach, each of these antennas 600 can share a common mounting pitch. By another approach, however, and as illustrated, some of the antennas 600 can be pitched differently from one another. In this particular illustrated example, a first group 801 of four of the antennas 600 have a first substantially-identical pitch while a second group 802 comprising the remaining four antennas 600 share a different substantially-identical pitch. (This reference to "substantially-identical" will be understood to refer to some appropriate small range of differences, such as plus-or-minus five degrees, plus-or-minus three degrees, plus-or-minus one degree, or the like.)

By one approach this pitch can be selected based on the height and spacing of the units so as to provide a uniform distribution of radio frequency power throughout the targeted space. If desired, the distribution of power can account for overlapping power from adjacent readers. For example: the pitch of an antenna pointing down a line between adjacent antennas might be tilted down more than the adjacent antennas in order to catch tags located more directly below the unit. Such a pitch will likely diminish the power distributed to the midpoint by this antenna but the power at the midpoint will be supplemented by power from the adjunct antennas, thereby accomplishing a sufficiently even and adequate power to the tags in this space.

In this particular illustrative example, the antennas 600 of the first group 801 are interleaved with the antennas 600 of the second group 802. For many application settings this can provide a very favorable operating field. These teachings will also accommodate various other approaches in these regards, however. In some settings, for example, it may be useful to have four adjacent antennas 600 share a same pitch while the remaining four antennas 600 have a different pitch. In other settings, it might be useful to individually adjust each antenna 600 such that each has a different resultant pitch.

Referring still to FIG. 1, step 102 can further comprise disposing the plurality of antenna units such that a plurality of these RFID tag reader antenna units are disposed higher than an expected location of at least 90% of the RFID tags when the RFID tags are in the facility. (The term "expected" refers to expectations and presumptions as pertain to the ordinary stocking, storing, or movement of RFID tags that are likely to properly occur within the facility and hence does not necessarily include inappropriate, unauthorized, or otherwise other-than-ordinary locations.)

Such a height can and will vary from one facility to the next. In some cases, a height of 8 feet or 10 feet may be appropriate while in other cases it may be desired to observe a height of, say, 12 to 15 feet. These teachings will also accommodate selecting a height that is greater than, or less than, the above mentioned 90% requirement. In some cases, for example, the antenna units may only be higher than an expected location of, say, 50% or 75% of the RFID tags while in other cases it may be appropriate for the antenna units to be placed higher than the expected location of all RFID tags within the facility.

Referring momentarily to FIG. 9, a given facility 900 having a plurality of RFID tags 901 located therein has three 360 degree RFID tag reader antenna arrays 500 installed, in this example, above these RFID tags 901. In this example these 360 degree RFID tag reader antenna arrays 500 are all disposed at a substantially same height within the facility. Other configurations are possible to suit particular operational requirements or opportunities, however. Generally speaking, the antennas themselves are likely pitched to provide radio frequency coverage in a region below and possibly about the antenna arrays 500 themselves.

Also in this example, these 360 degree RFID tag reader antenna arrays 500 are all mounted above the facility's ceiling 902 (which might comprise, for example, a so-called drop ceiling). In such a case, the ceiling 902 will preferably be at least largely comprised of material that is at least substantially transparent to radio frequency energy.

In this illustrative example the 360 degree RFID tag reader antenna arrays 500 are each disposed about a corresponding vertical support column 800 for the facility 900. These teachings will of course accommodate other approaches in these regards. These teachings will also support using one or more antenna arrays that are not full 360 degree arrays. This might comprise, for example, using a 90 degree array and mounting that 90 degree array in an interior corner of the facility 900. This might also comprise, as another example, using a 180 degree array and mounting that 180 degree array on an interior wall of the facility 900.

By one approach, these antenna arrays can be placed such that each services a discrete coverage area. For many application settings, however, it can be beneficial to configure such a multi-array approach to provide for overlapping coverage areas as between two or more such antenna arrays. As one simple example in these regards, it can be useful to dispose such arrays such that the power 903 emanated by one such array overlaps, at least to some extent, with the power 904 emanated by another such array.

This notion of permitting, or even ensuring, coverage overlap between two or more such antenna arrays may strike some skilled in the art as being non-useful or even wasteful of power. The applicant has determined, however, that such an approach can, in fact, provide certain benefits in certain application settings. For example, these teachings will often be employed in conjunction with RFID tags that are able to rectify an appropriate signal from any source in order to support its own power requirements, and this includes simultaneously-received signals. With this in mind, a tag that might not ordinarily receive sufficient power from a single receiver (due, for example, to the location of the RFID tag with respect to the sourcing antenna or to a signal blocker) can still receive enough power in the aggregate to operate by simultaneously receiving a signal from two or more overlapping antennas. This benefit, in turn, can permit the described antenna arrays to be located higher within the facility than one might ordinarily expect and still support an expected level of efficacy and operability in these regards.

By one approach, and referring now momentarily to FIG. 10, these teachings will also accommodate vertically stacking two or more such antenna arrays with respect to one another. In this particular illustrative example, a second antenna array 1002 is disposed above a first antenna array 1001 with both being disposed about a same vertical support column 800. In such a case, it may be useful to pitch the antennas 600 of one array differently from the antennas 600 of the other array.

Referring again to FIG. 1, at optional step 103 this process 100 will further provide for visually concealing one of more of these RFID tag reader antenna units (for example, to obscure viewing these units by a person standing on the floor of the corresponding facility). By one approach, and as already noted above, this can comprise installing the antenna units above a ceiling (presuming that the ceiling itself is largely visually opaque). By another approach, and as illustrated in FIG. 11, this can comprise concealing the antenna unit within a corresponding radio-frequency transparent shroud 1101. So configured, the shroud 1101 can visually conceal the antenna unit while interfering little or not at all with the transmission and reception of radio frequency signals.

The description suggested above that these antenna arrays can be installed through use of suspension cables or the like. FIG. 11 depicts a pair of such cables 1102. By one approach these cables 1102 can have a fixed length to retain the antenna array at a fixed vertical height. By another approach, however, these cables 1102 can cooperate with powered spools (that are powered, for example, by electric motors, mechanical mechanisms, or even human power) to thereby permit the cable length to be selectively shortened or lengthened as desired. Using this approach, for example, the antenna units can be selectively readily lowered to facilitate servicing the units without requiring any disassembly of the antenna array itself (other than, for example, to remove a shroud 1101 or the like) in order to gain access to the components of the unit.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:
1. An apparatus comprising:
at least one frame component comprising 1/xth of a 360 degree radio frequency identification (RFID) tag reader antenna array, wherein the frame component is configured to physically couple to at least one other of the frame components to form a multi-frame component;
at least one RFID tag reader antenna mount comprising a part of the frame component, wherein the RFID tag reader antenna mount is configured to aim a corresponding RFID tag reader antenna outwardly of the frame component;
a first group of the plurality of RFID tag reader antennas disposed at a first substantially-identical pitch and a second group of the plurality of RFID tag reader antennas are disposed at a second substantially-identical pitch, wherein the first substantially-identical pitch and the second substantially-identical pitch are different from one another;
such that connecting X of the frame components together will yield the 360 degree RFID tag reader antenna array having a plurality of RFID tag reader antennas disposed thereon and wherein the plurality of RFID tag reader antennas comprise a first group of the plurality of RFID tag reader antennas that are disposed at a first substantially-identical pitch and a second group of the plurality of RFID tag reader antennas that are disposed at a second substantially-identical pitch, wherein the first substan- tially-identical pitch and the second substantially-identical pitch are different from one another.

2. The apparatus of claim 1 wherein X equals 2.

3. The apparatus of claim 1 wherein X equals 4.

4. The apparatus of claim 1 wherein X equals at least 8.

5. The apparatus of claim 1 wherein the plurality of RFID tag reader antennas include at least two RFID tag reader antennas that are disposed on substantially opposing sides of the 360 degree RFID tag reader antenna array that are configured to radiate RFID tag interrogations outwardly of the multi-frame component.

6. The apparatus of claim 1 wherein the 360 degree RFID tag reader antenna array is laterally symmetrical about a central axis.

7. The apparatus of claim 6 wherein the 360 degree RFID tag reader antenna array comprises a symmetrically-shaped polygon.

8. The apparatus of claim 7 wherein the symmetrically-shaped polygon comprises an octagon.

9. The apparatus of claim 7 wherein the symmetrically-shaped polygon comprises square.

10. The apparatus of claim 1 wherein the RFID tag reader antennas of the first group are interleaved with the RFID tag reader antennas of the second group.

11. The apparatus of claim 1 wherein the RFID tag reader antenna comprises a plate antenna.

12. The apparatus of claim 1 wherein the RFID tag reader antenna comprises a phased array-type antenna.

13. The apparatus of claim 1 further comprising:

at least one RFID tag reader supported by the 360 degree RFID tag reader antenna array and operably coupled to the plurality of RFID tag reader antennas.

14. The apparatus of claim 13 further comprising:

at least a second RFID tag reader supported by the 360 degree RFID tag reader antenna array;

wherein the RFID tag reader antennas that are operably coupled to the RFID tag reader are interleaved with the RFID tag reader antennas that are operably coupled to the second RFID tag reader.

15. The apparatus of claim 1 further comprising:

a shroud disposed about the plurality of RFID tag reader antennas to visually conceal the plurality of RFID tag reader antennas, wherein the shroud is comprised of substantially radio frequency-transparent material.

* * * * *